(12) United States Patent
Shen et al.

(10) Patent No.: US 12,015,548 B2
(45) Date of Patent: Jun. 18, 2024

(54) METHOD AND DEVICE FOR IDENTIFICATION MANAGEMENT AND OPTIMIZED FORWARDING IN LARGE-SCALE POLYMORPHIC NETWORK

(71) Applicant: ZHEJIANG LAB, Zhejiang (CN)

(72) Inventors: Congqi Shen, Hangzhou (CN); Huifeng Zhang, Hangzhou (CN); Tao Zou, Hangzhou (CN); Ruyun Zhang, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/542,823

(22) Filed: Dec. 18, 2023

(65) Prior Publication Data

US 2024/0171509 A1    May 23, 2024

Related U.S. Application Data

(63) Continuation of application No. PCT/CN2023/078479, filed on Feb. 27, 2023.

(30) Foreign Application Priority Data

Nov. 4, 2022   (CN) .......................... 202211374977.0

(51) Int. Cl.
*H04L 45/00* (2022.01)
*H04L 45/74* (2022.01)
*H04L 69/22* (2022.01)

(52) U.S. Cl.
CPC .............. *H04L 45/38* (2013.01); *H04L 45/74* (2013.01); *H04L 69/22* (2013.01)

(58) Field of Classification Search
CPC .......... H04L 45/38; H04L 45/74; H04L 69/22
See application file for complete search history.

(56) References Cited

U.S. PATENT DOCUMENTS

| 2012/0176970 A1* | 7/2012 | Jin .......................... H04W 8/12 370/328 |
| 2013/0016664 A1* | 1/2013 | Wu ....................... H04L 61/103 370/328 |

(Continued)

FOREIGN PATENT DOCUMENTS

| CN | 105812261 A | 7/2016 |
| CN | 109639467 A | 4/2019 |

(Continued)

OTHER PUBLICATIONS

Xu, "Logistics Distribution Station Planning Method, and Server," English Machine Translation of Xu (WO 2019/242520 A1), Clarivate Analytics, pp. 1-14. (Year: 2024).*

(Continued)

*Primary Examiner* — Marcus Smith
*Assistant Examiner* — Kai Chang
(74) *Attorney, Agent, or Firm* — W&G Law Group

(57) ABSTRACT

A method and a device for identification management and optimized forwarding in a large-scale polymorphic network, the method comprising the follow steps: S1, constructing a polymorphic backbone network; S2, modality identification management; S3, determining a modality to be forwarded; S4, configuring a flow table for a switching node; S5, receiving a packet by a balanced distributor, and preliminarily parsing the type of the packet; S6, parsing key field information in the packet, determining the switching nodes to be allocated according to the key field information, and transmitting the key field information to the corresponding switching node; S7, the switching node matching the stored flow table according to the key field information to determine a correct forwarding action.

6 Claims, 3 Drawing Sheets

(56) References Cited

U.S. PATENT DOCUMENTS

| | | | |
|---|---|---|---|
| 2016/0269935 A1* | 9/2016 | Yang | .................... H04W 48/17 |
| 2020/0167694 A1 | 5/2020 | Pisner | |
| 2023/0047278 A1* | 2/2023 | Shen | .................... H04L 45/745 |

FOREIGN PATENT DOCUMENTS

| | | | |
|---|---|---|---|
| CN | 112565094 A | | 3/2021 |
| CN | 113259859 A | | 8/2021 |
| CN | 113765808 A | | 12/2021 |
| CN | 113852567 A | | 12/2021 |
| CN | 113938303 A | | 1/2022 |
| CN | 114244919 A | | 3/2022 |
| CN | 114500284 A | | 5/2022 |
| CN | 114884899 A | | 8/2022 |
| CN | 114885443 A | | 8/2022 |
| CN | 115426312 A | | 12/2022 |
| WO | WO-2019242520 A1 | * | 12/2019 |
| WO | 2020113545 A1 | | 6/2020 |
| WO | 2020154865 A1 | | 8/2020 |
| WO | 2022121367 A1 | | 6/2022 |

OTHER PUBLICATIONS

International Search Report (PCT/CN2023/078479); Date of Mailing: Jul. 11, 2023.
First Office Action(CN202211374977.0); Date of Mailing: Dec. 19, 2022.
Notice Of Allowance(CN202211374977.0); Date of Mailing: Jan. 11, 2023.
Research-on-heterogeneous-identifier-namespace-management-and-control-architecture-in-polymorphic-network-environment.
Flow-Caching-in-Protocol-Oblivious-Forwarding-Switches.
Development-Roadmap-of-Polymorphic-Intelligence-Network-Technology-Toward-2035.
Research-on-detection-method-of-network-information-local-exception-point-based-on-multi-modal-data-flow.
Communication-topology-reconstruction-method-for-multi-agent-cooperative-control-in-polymorphic-networks.

* cited by examiner

METHOD AND DEVICE FOR IDENTIFICATION MANAGEMENT AND OPTIMIZED FORWARDING IN LARGE-SCALE POLYMORPHIC NETWORK

CROSS-REFERENCE TO RELATED APPLICATIONS

The present application is a continuation of International Application No. PCT/CN2023/078479, filed on Feb. 7, 2023, which claims priority to Chinese Application No. 202211374977.0, filed on Nov. 4, 2022, the contents of both of which are incorporated herein by reference in their entireties.

TECHNICAL FIELD

The present disclosure relates to that technical field of polymorphic networks, in particular to a method and a device for identification management and optimized forwarding in a large-scale polymorphic network.

BACKGROUND

In a polymorphic network, a variety of network technology systems are running at the same time, and each technology system is a network modality. In order to forward packets with different network modalities at the same time, switches in the network need to configure different flow tables to adapt to different modalities. With the increasing number of access terminals, the network scale expands rapidly, and the corresponding flow table scale increases rapidly, bringing great pressure to the operation of the backbone network.

For the above needs, the current mainstream technology is to divide the network into autonomous domains and to set up a backbone network, thus reducing the flow table entries of each switch. At the same time, a programmable switch is configured to dynamically configure and maintain the flow table required by each modality in a programmatic way.

During the present disclosure is realized, the inventor found that the prior art has at least the follow problems:

First of all, the backbone network still uses the current network forwarding rule and matching technology, and the number of flow table entries on each switch will still increase sharply due to the increase of terminals, eventually affecting the network transmission delay. In addition, a number of gateway nodes are divided into different autonomous domains, but the maximum number of possible next hops for commercial forwarding devices is limited at present, for example, the maximum number of next hop addresses is 16 on Juniper Networks security devices, which seriously limits the size of autonomous domains and further increases the complexity of maintenance. Finally, although the programmable switch is capable dynamically deploying and maintaining the flow tables required by each modality, it is prone to failure and difficult to maintain quickly.

Therefore, a method and device for identification management and optimized forwarding in a large-scale polymorphic network is proposed to solve the above technical problems.

SUMMARY

The object of the present disclosure is to provide a method and a device for identification management and optimized forwarding in a large-scale polymorphic network to solve the problems of sharp increase in the scale of a flow table, increase in transmission delay, difficulty in maintaining the flow table and the like in the large-scale polymorphic network in the prior art.

The technical solution adopted by the present disclosure is as follows:

A method for identification management and optimized forwarding in a large-scale polymorphic network includes the following steps:

S1, constructing a polymorphic backbone network.

S2, modality identification management.

S3, matching switching resources for the switching nodes, and determining a modality to be forwarded.

S4, configuring a flow table for the switching nodes.

S5, receiving the packet by the balanced distributor, and preliminarily parsing a packet type;

S6, parsing a key field information in the packet according to the packet type by the balanced distributor, determining switching nodes to be allocated according to the key field information, and transmitting the key field information to a switching node corresponding to the key field information.

S7, matching the stored flow table according to the key field information by the switching nodes to determine a correct forwarding action.

Further, in S1, a plurality of switching clusters consisting of a balanced distributor and a preset number of switching nodes are deployed in a polymorphic network, the number of the switching nodes is determined by the number of modalities and the number of autonomous domains in the network, and replacing switches in the polymorphic network with the switching clusters to construct the polymorphic backbone network.

Further, in S2, running, by the polymorphic backbone network, a content identification modality, a geographic identification modality and an identity identification modality, defining a naming registration mode of the identification for the content identification modality, the geographic identification modality and the identity identification modality, and determining a forwarding action of a packet by the naming registration mode and matches the forwarding.

Further, the content identification modality is addressed by a content identification, the content identification is hierarchically named and comprises a plurality of fields, and a first field is defined to fill in target autonomous domain names for subsequent forwarding.

Further, the geographical identification modality is addressed by a geographical identification, and the geographical identification contains a target addressing area.

Further, the identity identification modality is addressed by an identity identification, and the identity identification contains an identity ID of a destination.

Further, in S4, splitting, for a same modality, the flow table needed for a same modality horizontally, and storing the flow table on the different switching nodes dispersedly by the modality identification management.

Further, S4 is specifically as follows:

For the content identification modality, a set of the target autonomous domain names is divided into a plurality of mutually disjoint content identification subsets, a number of the content identification subsets is a number of the switching nodes supporting the content identification, each content identification subset balances a load of each switching node, the target autonomous domain name contained in the each content identification subset is configured for the balanced distributor to quickly determine the switching nodes to be allocated at the same time, the each switching node supporting the content identification modality is responsible for matching the target autonomous domain names in the content identification modality, respectively, and the switching nodes determine a correct forwarding port according to the target autonomous domain name in the packet.

For the geographical identification modality, the target addressing area is divided into a plurality of non-overlapping sub-areas, and a number of the sub-areas is a number of the switching nodes supporting the geographical identification modality, and each switching node supporting the geographical identification modality is responsible for matching and storing all the target addressing areas in the geographical identification modality, respectively; when the target addressing area is smaller, a corresponding flow table entry has a higher priority, and will be matched first; when forwarding a packet, the switching node is capable determining the correct forwarding port by determining that the target addressing area in the packet belongs to one of all the target addressing areas.

For the identity identification modality, the identity ID registered in the polymorphic network is divided into a plurality of mutually disjoint identity ID subsets, a number of the identity ID subsets is a number of the switching nodes supporting the identity identification, each identity ID subset balances the load of the each switching node, the identity ID contained in each identity ID subset is configured for the balanced distributor to quickly determine the switching nodes to be allocated at the same time, the each switching node supporting the identity identification modality is responsible for matching the identity ID of the destination in the identity identification modality, respectively, and the switching nodes determine the correct forwarding port according to the identity ID of the destination in the packet.

Further, S5 specifically comprises the balanced distributor determining a corresponding packet type by parsing the type field of the packet.

When the type field of the packet is 0x8624, the packet type is the content identification modality.

When the type field of the packet is 0x8947, the packet type is the geographical identification modality.

When the type field of the packet is 0x27C0, the packet type is the identity identification modality.

Further, in S6, when the parsed packet type is the content identification modality, a content name in the parsed packet is nested in a "type-length-value" way to obtain the target autonomous domain name.

When the parsed packet type is the geographical identification modality, a content with a length of 12 bytes is extracted by shifting from the type field of the packet by 40 bytes to obtain the target addressing area.

When the parsed packet type is the identity identification modality, an identity identification information of a destination user of the packet is obtained, and the identity ID of the destination is determined.

Further, in S7, when the packet type is the content identification modality, the switching nodes match the target autonomous domain name and forward the packet to a correct target autonomous domain.

When the packet type is the geographical identification modality, the switching nodes sequentially determine whether the key field information belongs to the corresponding target addressing area in the flow table according to the priority, and executes the forwarding action in the flow table on a first match.

When the packet type is the identity identification modality, the switching nodes match the identity ID of the destination and determine the forwarding action to be executed.

The present disclosure further provides a device for identification management and optimized forwarding in a large-scale polymorphic network, comprising a memory and one or more processors, the memory stores executable codes, and when the executable codes are executed by the one or more processors, the device is used for implementing the method for identification management and optimized forwarding in a large-scale polymorphic network according to any one of the above embodiments.

The present disclosure further provides a computer-readable storage medium on which a program is stored, and the program, when executed by a processor, is configured to implement the method for identification management and optimized forwarding in a large-scale polymorphic network according to any one of the above embodiments.

The present disclosure has the beneficial effects that the naming management is carried out on the modality identifications used for routing in the polymorphic network, and the flow table scale is controlled, so as to adapt to the large-scale polymorphic network; at the same time, programmable switching node components are used to switch clusters, and the inlet traffic is pre-allocated to speed up the forwarding; in addition, splitting the flow table in a polymorphic network can reduce the complexity of maintaining the flow table in a large-scale network and has good scalability; in the aspect of modality identification management, the hierarchical naming of the content identification is defined to make it contain the information of a target autonomous domain, which avoids the need for switching nodes to completely parse and calculate the content identification and avoid increasing the size of the flow table due to the diversification of requested content; in the aspect of flow table setting, it is defined that the geographical modality only matches whether it belongs to the coverage of some autonomous domains, which effectively controls the flow table scale; in the aspect of switching cluster configuration, a balanced distributor is set up to pre-allocate the inlet traffic and speed up the forwarding; in addition, splitting the flow table in a polymorphic network can reduce the complexity of maintaining the flow table in a large-scale network and has good scalability.

DESCRIPTION OF EMBODIMENTS

The following description of at least one exemplary embodiment is merely illustrative in nature and is in no way intended to limit the present disclosure, its application or uses. Based on the embodiments in the present disclosure, all other embodiments obtained by those having ordinary skill in the art without creative work belong to the scope of protection of the present disclosure.

Figure 1:
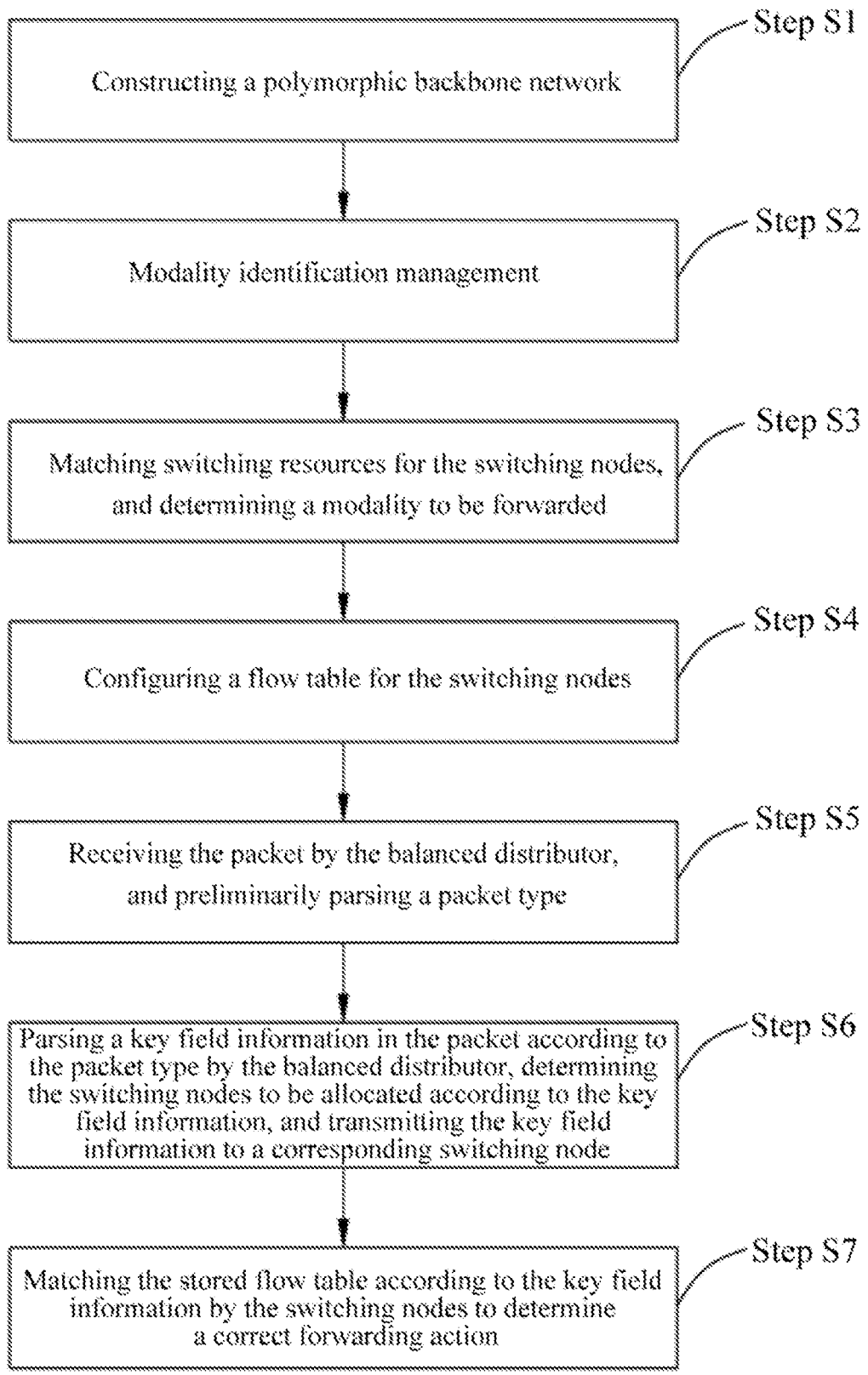
FIG. 1 is a flow diagram of a method for identification management and optimized forwarding in a large-scale polymorphic network according to the present disclosure.

Referring to FIG. 1, a method for identification management and optimized forwarding in a large-scale polymorphic network includes that follow steps:

S1, a polymorphic backbone network is constructed.

A plurality of switching clusters consisting of one balanced distributor and a preset number of switching nodes are deployed in the polymorphic network, the number of the switching nodes is determined by the number of modalities and the number of autonomous domains in the polymorphic network, and switches in the polymorphic network are replaced with the switching clusters to construct the polymorphic backbone network.

S2, modality identification management.

The polymorphic backbone network runs a content identification modality, a geographic identification modality and an identity identification modality, defines the naming registration mode of the identification for the content identification modality, the geographic identification modality and the identity identification modality, and determines the forwarding action of the packet by the naming registration mode and matches the forwarding.

The content identification modality is addressed by the content identification, and the content identification is named hierarchically and comprises a plurality of fields, and the first field is defined to fill in the target autonomous domain name for subsequent forwarding.

The geographical identification modality is addressed by the geographical identification, and the geographical identification contains the target addressing area.

The identity identification modality is addressed by the identity identification, and the identity identification contains the identity ID of the destination.

S3, resources are matched for the switching nodes, and the modalities to be forwarded are determined.

S4, a flow table for the switching nodes is configured.

For a same modality, the flow table needed for the same modality is split horizontally, and the flow table is stored on the different switching nodes by the modality identification management.

For the content identification modality, the set of the target autonomous domain names is divided into a plurality of mutually disjoint content identification subsets, the number of the content identification subsets is the number of the switching nodes supporting the content identification, each content identification subset balances the load of the each switching node, the target autonomous domain name contained in the each content identification subset is used for the balanced distributor to quickly determine the switching nodes to be allocated at the same time, the each switching node supporting the content identification modality is responsible for matching the target autonomous domain names in the content identification modality, respectively, and the switching node determines the correct forwarding port according to the target autonomous domain name in the packet.

For the geographical identification modality, the target addressing area is divided into a plurality of non-overlapping sub-areas, and the number of the sub-areas is the number of switching nodes supporting the geographical identification modality, and each switching node supporting the geographical identification modality is responsible for matching and storing all the target addressing areas in the geographical identification modality respectively; when the target addressing area is smaller, the corresponding flow table entry has the higher priority, and will be matched first; when forwarding the packet, the switching node can determine the correct forwarding port by determining that the target addressing area in the packet belongs to one of all the target addressing areas.

For the identity identification modality, the identity ID registered in the polymorphic network is divided into a plurality of mutually disjoint identity ID subsets, the number of the identity ID subsets is the number of the switching nodes supporting the identity identification, each identity ID subset balances the load of the each switching node, the identity ID contained in the each identity ID subset is used for the balanced distributor to quickly determine the switching nodes to be allocated at the same time, the each switching node supporting the identity identification modality is responsible for matching the identity ID of the destination in the identity identification modality, respectively, and the switching nodes determine the correct forwarding port according to the identity ID of the destination in the packet.

S5, the packet is received by the balanced distributor, and the packet type is preliminarily parsed.

The balanced distributor determines the corresponding packet type by parsing the type field of the packet.

When the type field of the packet is 0x8624, the packet type is the content identification modality.

When the type field of the packet is 0x8947, the packet type is the geographical identification modality.

When the type field of the packet is 0x27C0, the packet type is the identity identification modality.

S6, the balanced distributor parses key field information in the packet according to the packet type, determines the switching nodes to be allocated according to the key field information, and transmits the key field information to the switching node corresponding to the key field information.

When the parsed packet type is the content identification modality, the content name in the parsed packet is nested in the "type-length-value" way to obtain the target autonomous domain name.

When the parsed packet type is the geographical identification modality, the content with a length of 12 bytes is extracted by shifting from the type field of the packet by 40 bytes to obtain the target addressing area.

When the parsed packet type is the identity identification modality, the identity identification information of the destination user of the packet is obtained, and the identity ID of the destination is determined.

S7, the switching node matching the stored flow table according to the key field information to determine the correct forwarding action.

When the packet type is the content identification modality, the switching nodes match the target autonomous domain name and forward the packet to the correct target autonomous domain.

When the packet type is the geographical identification modality, the switching node sequentially determines whether the key field information belongs to the corresponding target addressing area in the flow table according to the priority, and executes the forwarding action in the flow table on the first match.

When the packet type is the identity identification modality, the switching nodes match the identity ID of the destination and determine the forwarding action to be executed.

Figure 2:
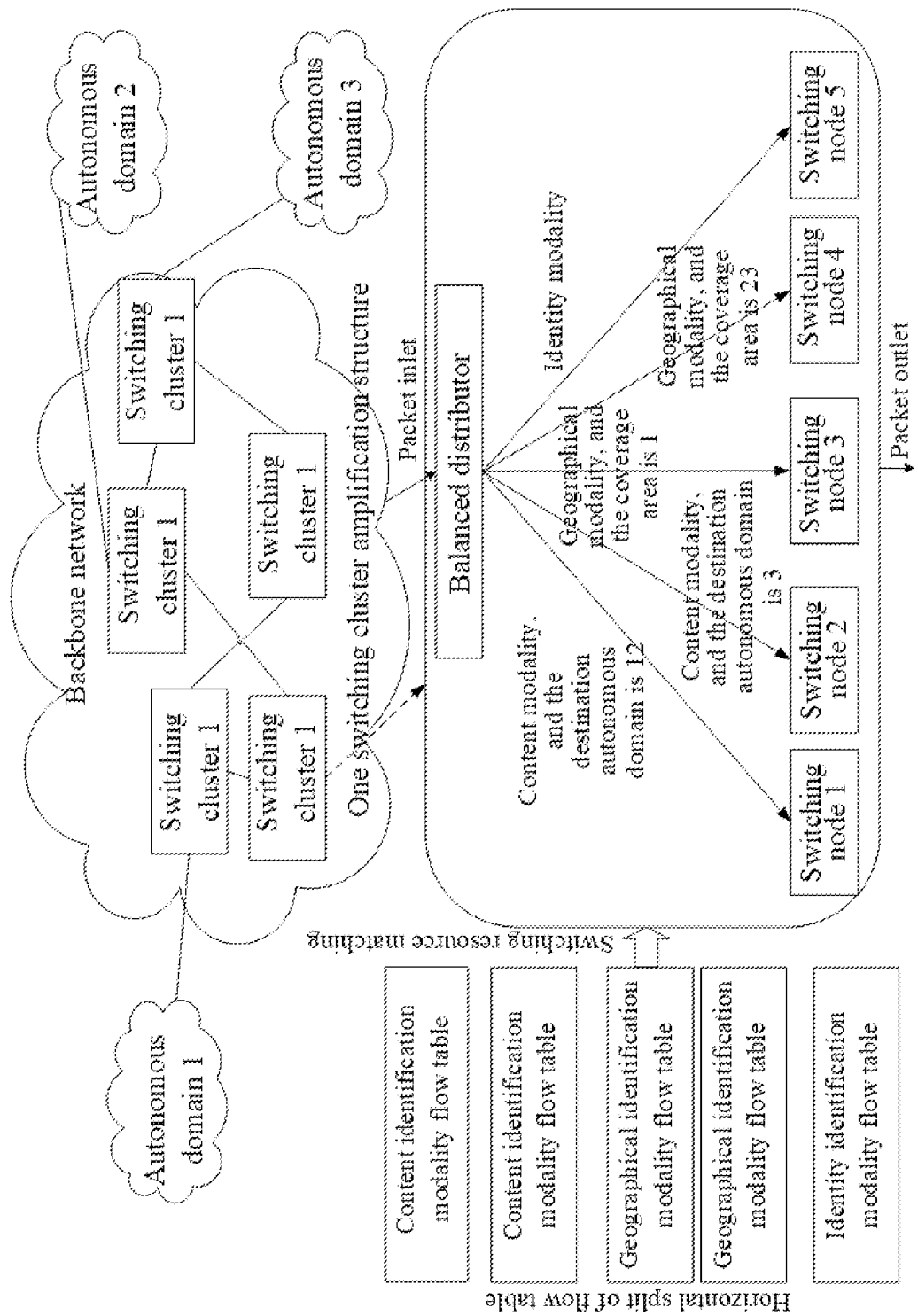
FIG. 2 is a frame diagram of a switching cluster of an embodiment.

Refer to FIG. 2, in an embodiment, a method for identification management and optimized forwarding in a large-scale polymorphic network includes that follow steps:

S1, a polymorphic backbone network is constructed.

A plurality of switching clusters consisting of one balanced distributor and N switching nodes are deployed in a polymorphic network, the number of the switching nodes is determined by the number of modalities and the number of autonomous domains in the polymorphic network, and switches in the polymorphic network are replaced with the switching clusters to construct the polymorphic backbone network.

The polymorphic backbone network receives the packet from the autonomous domain and forwards it to the corresponding target autonomous domain correctly.

S2, modality identification management.

The polymorphic backbone network runs the content identification modality, the geographic identification modality and the identity identification modality, defines the naming registration mode of the identification for the content identification modality, the geographic identification modality and the identity identification modality, and determines the forwarding action of the packet by the naming registration mode and matches the forwarding.

The content identification modality is addressing by the content identification, and the content identification is named hierarchically and comprising a plurality of fields, the first field is defined to be filled with target autonomous domain names for subsequent forwarding.

The geographical identification modality is addressed by the geographical identification, and the geographical identification contains the target addressing area.

The identity identification modality is addressed by the identity identification, and the identity identification contains the identity ID of the destination.

S3, resources are matched for the N switching nodes, and the modalities to be forwarded are determined.

Because different modality types have different matching methods and specific matching fields, the requirements for resource characteristics on switching nodes are further different. Therefore, different switching nodes are configured with different resources, including ASIC, CPU, FPGA, etc., to adapt to different modalities. $k_1$ represents the number of switching nodes bearing the content identification modality, and the node serial numbers are represented as $i_1^1, i_1^2, \ldots, i_1^{k_1}$. $k_2$ is used to represent the number of switching nodes bearing the geographical identification modality, respectively, and the serial number of the switching nodes is expressed as $i_2^1, i_2^2, \ldots i_2^{k_2}$. $k_3$ is used to represent the number of the switching nodes bearing the identity identification modality, and the serial numbers of the switching nodes are represented as $i_3^1, i_3^2, \ldots, i_3^{k_3}$, respectively, where $k_1+k_2+k_3=N$.

S4, a flow table for the switching nodes is configured.

For a same modality, the flow table needed for the same modality is split horizontally, and the flow table is stored in the different switching nodes by the modality identification management at the same time.

For the content identification modality, the set of the target autonomous domain names is divided into a plurality of disjoint content identification subsets, the number of the content identification subsets is the number of the switching nodes supporting the content identification, each content identification subset balances a load of each switching node, and at the same time, the target autonomous domain name contained in each content identification subset is used for the balanced distributor to quickly determine the switching nodes to be allocated; each switching node supporting the content identification modality is responsible for matching the target autonomous domain names in the content identification modality, respectively, and the switching node determines correct forwarding port according to the target autonomous domain name in the packet.

Assuming that the set of all possible target autonomous domain names in the polymorphic backbone network is $\zeta$, the target autonomous domain name set $\zeta$ is divided into $k_1$ disjoint content identification subsets, which are recorded as $\zeta_1^1, \zeta_1^2, \ldots, \zeta_1^{k_1}$, respectively, $\zeta_1^1 \cup \zeta_1^2 \cup \ldots \cup \zeta_1^{k_1} = \zeta$; the switching node $i_1^j$ stores all target autonomous domain names in the content identification subset $\zeta_1^j$ (j=1, 2, \ldots, $k_1$) and the corresponding forwarding ports, and it only needs to determine the correct forwarding port according to the target autonomous domain names in the packet.

For the geographical identification modality, the target addressing area is divided into a plurality of non-overlapping sub-areas, and the number of the sub-areas is the number of switching nodes supporting the geographical identification modality, and the each switching node supporting the geographical identification modality is responsible for matching and storing all the target addressing areas in the geographical identification modality respectively; when the target addressing area is smaller, the corresponding flow table entry has the higher priority, and will be matched first; when forwarding the packet, the switching node can determine the correct forwarding port by determining that the target addressing area in the packet belongs to one of all the target addressing areas.

Assuming that the whole set of the target addressing areas covered by polymorphic backbone network is $\gamma$, the actual information set $\gamma$ of the target addressing areas is divided into $k_2$ mutually disjoint sub-areas, which are recorded as $\gamma_2^1, \gamma_2^2, \ldots, \gamma_2^{k_2}$, and the set of each sub-area is $\gamma_2^1 \cup \gamma_2^2 \cup \ldots \cup \gamma_2^{k_2}$; the switching node $i_2^u$ stores all possible target addressing areas in the sub-area $\gamma_2^u$ (u=1, 2, \ldots, $k_2$), that is, the coverage area of the autonomous domain involved in $\gamma_2^u$ and all possible combination areas of adjacent autonomous domains, where if the target addressing area is smaller, the corresponding flow table entry will have a higher priority and will be matched first; when forwarding a packet, the correct forwarding port can be determined only by determining whether the target addressing area in the packet belongs to one of all possible target addressing areas in the subset $\gamma_2^u$.

For the identity identification modality, the identity ID registered in the polymorphic network is divided into a plurality of mutually disjoint identity ID subsets, the number of the identity ID subsets is the number of the switching nodes supporting the identity identification, the each identity ID subset balances the load of each switching node, the identity ID contained in each identity ID subset is used for the balanced distributor to quickly determine the switching nodes to be allocated at the same time, the each switching node supporting the identity identification modality is responsible for matching the identity ID of the destination in the identity identification modality, respectively, and the switching node determines the correct forwarding port according to the identity ID of the destination in the packet.

Assuming that the identity ID set of the whole users covered by the polymorphic network is $\psi$, and the whole user identity ID set $\psi$ is divided into $k_3$ mutually disjoint identity ID subsets, which are recorded as $\psi_3^1, \psi_3^2, \ldots, \psi_3^{k_3}$, where the set of various identity ID subsets $\psi_3^1 \cup \psi_3^2 \cup \ldots \cup \psi_3^{k_3} = \psi$; the switching node $i_3^v$ (v=1, 2, \ldots, $k_3$) stores all possible destination IDs in the identity ID subset $\psi_3^v$ and corresponding forwarding ports; and the correct forwarding port is determined according to the identity ID of the destination in the packet.

This design can split the flow table horizontally, which can reduce the flow table entries on each switching node and shorten the matching query time.

S5, the packet is received by the balanced distributor, and the packet type of the packet is preliminarily parsed.

The balanced distributor determines the corresponding packet type by parsing the type field of the packet.

When the type field of the packet is 0x8624, the packet type is the content identification modality.

When the type field of the packet is 0x8947, the packet type is the geographical identification modality.

When the type field of the packet is 0x27C0, the packet type is the identity identification modality.

S6, the balanced distributor parses key field information in the packet according to the type of the packet, determines the switching nodes to be allocated according to the key field information, and transmits the key field information to the switching node corresponding to the key field information.

When the parsed packet type is the content identification modality, the content name in the parsed packet is nested in the "type-length-value" way to obtain the target autonomous domain name. IF the parsed name belongs to a subset $\zeta_1^j$, it is forwarded to the switching node $i_1^j$.

When the parsed packet type is the geographical identification modality, the content with a length of 12 bytes is extracted by shifting from the type field of the packet by 40 bytes to obtain the target addressing area; if the parsed target addressing area is part of $\gamma_2^u$, it is forwarded to $i_2^u$.

When the parsed packet type is the identity identification modality, the identity identification information of the destination user of the packet is obtained, and the identity ID of the destination is determined; if the parsed identity ID of the destination belongs to a subset $\psi_3^v$, it is forwarded to $i_3^v$.

S7, the switching node matching the stored flow table according to the key field information to determine the correct forwarding action.

When the packet type is the content identification modality, the switching node matches the target autonomous domain name and forwards the packet to the correct target autonomous domain.

When the packet type is the geographical identification modality, the switching node sequentially determines whether the key field information belongs to the corresponding target addressing area in the flow table according to the priority, and executes the forwarding action in the flow table on the first match.

When the packet type is the identity identification modality, the switching node matches the identity ID of the destination and determines the forwarding action to be executed.

Corresponding to the aforementioned embodiment of the method for identification management and optimized forwarding in the large-scale polymorphic network, the present disclosure further provides the embodiment of the device for identification management and optimized forwarding in the large-scale polymorphic network.

Figure 3:
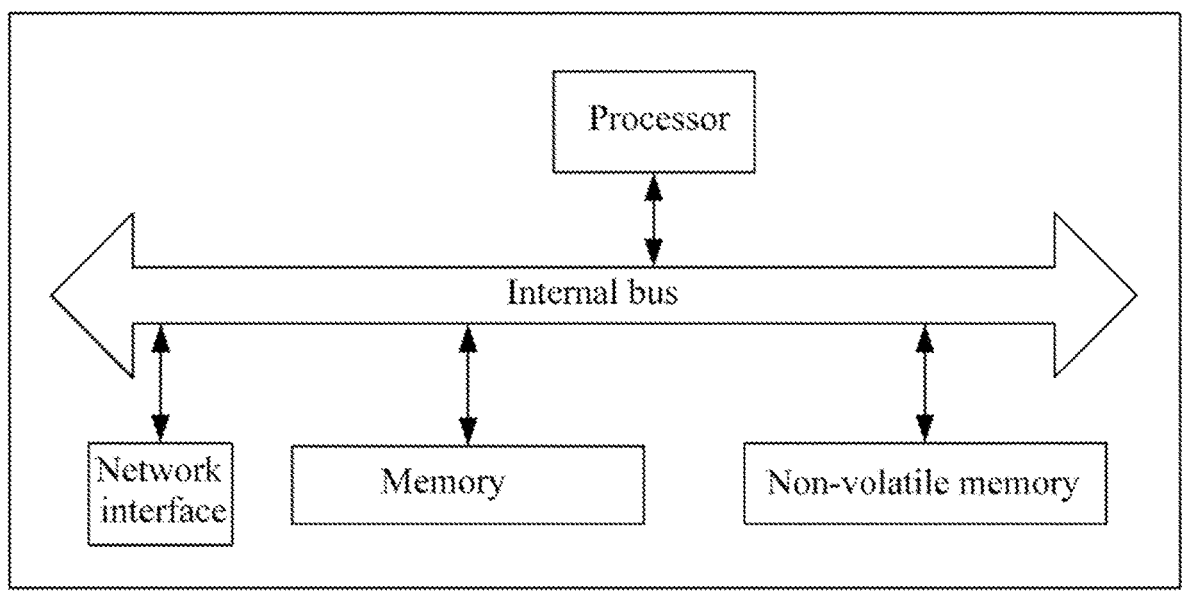
FIG. 3 is a schematic structural diagram of a device for identification management and optimized forwarding in a large-scale polymorphic network of the present disclosure.

Referring to FIG. 3, the device for identification management and optimized forwarding in the large-scale polymorphic network provided by the embodiment of the present disclosure includes the memory and one or more processors, the memory stores executable codes, and when the executable codes are executed by the one or more processors, the device is used for implementing the method for identification management and optimized forwarding in the large-scale polymorphic network in the above embodiment.

An embodiment of the device for identification management and optimized forwarding in the large-scale polymorphic network of the present disclosure can be applied to any equipment with data processing capability, which can be a device or apparatus such as a computer. The embodiment of the device can be realized by software, or by hardware or a combination of hardware and software. Taking the software implementation as an example, as a logical device, it is formed by reading the corresponding computer program instructions in a non-volatile memory into the memory through the processor of any equipment with data processing capability. From the hardware level, as shown in FIG. 3, it is a hardware structure diagram of any equipment with data processing capability where the Internet of Things equipment in collaboration with a linkage device is located. In addition to the processor, memory, network interface and nonvolatile memory shown in FIG. 3, any equipment with data processing capability where the device is located in the embodiment usually includes other hardware according to the actual functions of the equipment with data processing capability, which will not be described here again.

The implementation process of the functions and functions of each unit in the above-mentioned device is detailed in the implementation process of the corresponding steps in the above-mentioned method, and will not be repeated here.

For the device embodiment, because it basically corresponds to the method embodiment, it is only necessary to refer to part of the description of the method embodiment for the relevant points. The device embodiments described above are only schematic, in which the units described as separate components may or may not be physically separated, and the components displayed as units may or may not be physical units, that is, they may be located in one place or allocated to multiple network units. Some or all of the modules can be selected according to actual needs to achieve the purpose of the solution of the present disclosure. Those skilled in the art can understand and implement it without creative labor.

An embodiment of the present disclosure further provides a computer-readable storage medium, on which a program is stored, which, when executed by a processor, implements the method for identification management and optimized forwarding in a large-scale polymorphic network in the above embodiment.

The computer-readable storage medium can be an internal storage unit of any equipment with data processing capability as described in any of the previous embodiments, such as a hard disk or a memory. The computer-readable storage medium may further be an external storage device of any equipment with data processing capability, such as a plug-in hard disk, Smart Media Card (SMC), SD card, Flash Card and the like provided on the device. Further, the computer-readable storage medium may further include both internal storage units and external storage devices of any equipment with data processing capability. The computer-readable storage medium is used for storing the computer program and other programs and data required by any equipment with data processing capability, and may further be used for temporarily storing data that has been output or will be output.

The above is only the preferred embodiment of the present disclosure, and it is not used to limit the present disclosure. Any modification, equivalent substitution or improvement made within the spirit and principle of the present disclosure should be included in the protection scope of the present disclosure.

What has been described above is only the preferred embodiment of the present disclosure, and it is not used to limit the present disclosure. For those skilled in the art, the present disclosure may have various modifications and changes. Any modification, equivalent substitution, improvement, etc. made within the spirit and principle of the present disclosure shall be included in the protection scope of the present disclosure.

What is claimed is:

1. A method for identification management and optimized forwarding in a large-scale polymorphic network, comprising:
   step S1, constructing a polymorphic backbone network, comprising:
   deploying a plurality of switching clusters comprising one balanced distributor and a preset number of switching nodes in a polymorphic network, wherein a number of the switching nodes is determined by a number of modalities and a number of autonomous domains in the polymorphic network, and
   replacing a switch in the polymorphic network with the switching clusters to construct the polymorphic backbone network;
   step S2, modality identification management, comprising:
   running, by the polymorphic backbone network, a content identification modality, a geographic identification modality and an identity identification modality,
   defining a naming registration mode of an identification for the content identification modality, the geographic identification modality and the identity identification modality, and
   determining a forwarding action of a packet by the naming registration mode and matching a forwarding;
   wherein the content identification modality is addressed by a content identification, the content identification is hierarchically named and comprises a plurality of fields, and a first field is defined to fill in a target autonomous domain name for subsequent forwarding;
   wherein the geographical identification modality is addressed by a geographical identification, and the geographical identification comprises a target addressing area; and
   wherein the identity identification modality is addressed by an identity identification, and the identity identification comprises an identity ID of a destination;
   step S3, matching switching resources for the switching nodes, and determining a modality to be forwarded;
   step S4, configuring a flow table for the switching nodes, comprising:
   splitting, for a same modality, the flow table needed for a same modality horizontally, and
   storing the flow table on the different switching nodes dispersedly by the modality identification management,
   wherein for the content identification modality, dividing a set of the target autonomous domain name into a plurality of mutually disjoint content identification subsets, wherein a number of the content identification subsets is a number of the switching nodes supporting the content identification, each content identification subset balances a load of each switching node, the target autonomous domain name comprised in the each content identification subset is configured for the balanced distributor to quickly determine the switching nodes to be allocated at the same time, the each switching node supporting the content identification modality is responsible for matching the target autonomous domain name in the content identification modality, respectively, and the switching nodes determine a correct forwarding port according to the target autonomous domain name in the packet;
   wherein for the geographical identification modality, dividing the target addressing area into a plurality of non-overlapping sub-areas, wherein a number of the sub-areas is a number of the switching nodes supporting the geographical identification modality, and each switching node supporting the geographical identification modality is responsible for matching and storing all the target addressing areas in the geographical identification modality, respectively; when the target addressing area is smaller, a corresponding flow table entry has a higher priority, and will be matched first; and the switching nodes is capable determining the correct forwarding port by determining that the target addressing area in the packet belongs to one of all the target addressing areas when forwarding the packet; and
   wherein for the identity identification modality, dividing the identity ID registered in the polymorphic network into a plurality of mutually disjoint identity ID subsets, wherein a number of the identity ID subsets is a number of the switching nodes supporting the identity identification, each identity ID subset balances the load of the each switching node, the identity ID comprised in the each identity ID subset is configured for the balanced distributor to quickly determine the switching nodes to be allocated at the same time, the each switching node supporting the identity identification modality is responsible for matching the identity ID of the destination in the identity identification modality, respectively, and the switching nodes determine the correct forwarding port according to the identity ID of the destination in the packet;
   step S5, receiving the packet by the balanced distributor, and preliminarily parsing a packet type;
   step S6, parsing a key field information in the packet according to the packet type by the balanced distributor, determining switching nodes to be allocated according to the key field information, and transmitting the key field information to a switching node corresponding to the key field information; and
   step S7, matching the stored flow table according to the key field information by the switching nodes to determine a correct forwarding action.

2. The method for identification management and optimized forwarding in the large-scale polymorphic network according to claim 1,
   wherein the step S5 further comprises:
   determining, by the balanced distributor, a corresponding packet type by parsing a type field of the packet;
   wherein when the type field of the packet is 0x8624, the packet type is the content identification modality;
   wherein when the type field of the packet is 0x8947, the packet type is the geographical identification modality; and
   wherein when the type field of the packet is 0x27C0, the packet type is the identity identification modality.

3. The method for identification management and optimized forwarding in the large-scale polymorphic network according to claim 1,
   wherein when a parsed packet type is the content identification modality, a content name in a parsed packet is nested in a "type-length-value" way to obtain the target autonomous domain name in the step S6;
   wherein when the parsed packet type is the geographical identification modality, a content with a length of 12 bytes is extracted by shifting from the type field of the packet by 40 bytes to obtain the target addressing area; and
   wherein when the parsed packet type is the identity identification modality, an identity identification information of a destination user of the packet is obtained, and the identity ID of the destination is determined.

4. The method for identification management and optimized forwarding in the large-scale polymorphic network according to claim 3,
   wherein when the packet type is the content identification modality, the switching nodes match the target autonomous domain name and forward the packet to a correct target autonomous domain in the step S7;
   wherein when the packet type is the geographical identification modality, the switching nodes sequentially determine whether the key field information belongs to the corresponding target addressing area in the flow table according to the priority, and executes the forwarding action in the flow table on a first match; and
   wherein when the packet type is the identity identification modality, the switching nodes match the identity ID of the destination and determine the forwarding action to be executed.

5. A device for identification management and optimized forwarding in a large-scale polymorphic network, comprising a memory and one or more processors, wherein the memory stores executable codes, and the one or more processors, when executing the executable codes, is configured to implement the method for identification management and optimized forwarding in the large-scale polymorphic network according to claim 1.

6. A non-transitory computer-readable storage medium on which a program is stored, wherein the program, when executed by a processor, is configured to implement the method for identification management and optimized forwarding in the large-scale polymorphic network according to claim 1.

* * * * *